US008918902B1

(12) United States Patent
Kim et al.

(10) Patent No.: US 8,918,902 B1
(45) Date of Patent: Dec. 23, 2014

(54) ADVERTISEMENTS AS KEYS FOR STREAMING PROTECTED CONTENT

(75) Inventors: Minji Kim, Cambridge, MA (US);
Muriel Medard, Belmont, MA (US);
Ali ParandehGheibi, Medford, MA (US)

(73) Assignee: Massachusettes Institute of Technology, Cambridge, MA (US)

( * ) Notice: Subject to any disclaimer, the term of this patent is extended or adjusted under 35 U.S.C. 154(b) by 126 days.

(21) Appl. No.: 13/104,516

(22) Filed: May 10, 2011

(51) Int. Cl.
*G06F 21/00* (2013.01)
*G06F 21/31* (2013.01)

(52) U.S. Cl.
CPC ..................................... *G06F 21/31* (2013.01)
USPC ............................................................ 726/28

(58) Field of Classification Search
CPC ........................................................ G06F 21/31
USPC ............................................................ 726/28
See application file for complete search history.

(56) References Cited

U.S. PATENT DOCUMENTS

| 7,529,198 | B2 * | 5/2009 | Jain et al. ........................ 370/256 |
|---|---|---|---|
| 8,245,310 | B2 * | 8/2012 | Grigorovitch et al. .......... 726/28 |
| 2001/0056573 | A1 * | 12/2001 | Kovac et al. .................... 725/32 |
| 2002/0021801 | A1 * | 2/2002 | Shimoyama et al. ............ 380/29 |
| 2002/0077987 | A1 * | 6/2002 | Hasegawa ........................ 705/52 |
| 2004/0267889 | A1 * | 12/2004 | Graham et al. ................. 709/206 |
| 2005/0204038 | A1 * | 9/2005 | Medvinsky et al. ........... 709/225 |
| 2006/0098815 | A1 * | 5/2006 | O'Neil ............................. 380/28 |
| 2006/0117391 | A1 * | 6/2006 | Kim ................................. 726/27 |
| 2006/0236221 | A1 * | 10/2006 | McCausland et al. ...... 715/500.1 |
| 2006/0253542 | A1 * | 11/2006 | McCausland et al. ......... 709/207 |
| 2007/0162428 | A1 * | 7/2007 | Williams et al. ................... 707/3 |
| 2007/0266399 | A1 * | 11/2007 | Sidi ................................. 725/42 |
| 2007/0283381 | A1 * | 12/2007 | Sidi et al. ........................ 725/32 |
| 2008/0021775 | A1 * | 1/2008 | Lerman et al. .................. 705/14 |
| 2008/0208692 | A1 * | 8/2008 | Garaventi et al. ............... 705/14 |
| 2008/0215437 | A1 * | 9/2008 | Levy et al. ...................... 705/14 |
| 2008/0262922 | A1 * | 10/2008 | Ahn et al. ........................ 705/14 |
| 2008/0276269 | A1 * | 11/2008 | Miller et al. .................... 725/34 |
| 2008/0320551 | A1 * | 12/2008 | Grigorovitch et al. ............ 726/1 |
| 2009/0083145 | A1 * | 3/2009 | Lee ................................. 705/14 |
| 2009/0083631 | A1 * | 3/2009 | Sidi et al. ....................... 715/721 |
| 2010/0319049 | A1 * | 12/2010 | Dubhashi et al. ................ 726/1 |

OTHER PUBLICATIONS

Gao et al.; SmartMobile-AD: An Intelligent Mobile Advertising System; Published in: Grid and Pervasive Computing Workshops, 2008. GPC Workshops '08. The 3rd International Conference on; Date of Conference: May 25-28, 2008; pp. 164-171; IEEE Xplore.*

Lee; Secure incentives for commercial ad dissemination in vehicular networks; Published in: Proceeding MobiHoc '07 Proceedings of the 8th ACM international symposium on Mobile ad hoc networking and computing; 2007; pp. 150-159; ACM Digital Library.*

* cited by examiner

*Primary Examiner* — Bradley Holder
(74) *Attorney, Agent, or Firm* — Anderson Gorecki & Rouille LLP

(57) ABSTRACT

A method, apparatus and computer program product for using advertisements as keys for streaming protected content is presented. Protected content is received at a user computer system, wherein the protected content is not viewable by the user. Appended content, such as an advertisement, is also received at the user computer system. The user views the appended content, wherein the viewing of the appended content results in the protected content being viewable by the user. The user then views the protected content.

12 Claims, 3 Drawing Sheets

ADVERTISEMENTS AS KEYS FOR STREAMING PROTECTED CONTENT

BACKGROUND

In current systems, when a user (also referred to herein as a client) desires to download and view content, the user may be required to view an advertisement before the user can view the requested content. For example, on a website for viewing television programs, a client requests a particular television program for viewing on their computer. In order to enforce that clients view advertisements (referred to herein as "appended content") before the desired content (referred to herein as protected content), the appended content is streamed/downloaded to the client before the content streaming starts. For example, there may be a first server that serves the advertisements and a second server that serves the protected content (where the first server and the second server may be distinct servers or the same server). When the client requests to download/stream the protected content, the first server will initiate a transfer of the advertisement to the client. Once the advertisement has been downloaded/streamed (and the user has viewed it), the second server initiates a transfer of the protected content. In essence, in the current systems, the right to the content is tied to the act of downloading/streaming the content. Therefore, the download of the content only starts after the client has met the prerequisite, which is viewing the advertisement in this example.

SUMMARY

Conventional mechanisms such as those explained above suffer from a variety of deficiencies. One such deficiency is that the conventional method of ordering the download of appended content and the protected content can lead to inefficient use of the network resources. Since the streaming of the protected content only begins after the streaming of the appended content has been completed, this method may cause higher delay in content delivery; therefore, decreasing the client's quality of experience. In addition, the second server may be idle while the first server is serving the advertisement to the client, resulting in a waste of resources.

Embodiments of the invention significantly overcome such deficiencies and provide mechanisms and techniques that provide advertisements as keys for streaming protected content.

In a particular embodiment of a method for providing advertisements as keys for streaming protected content is presented. The method begins by receiving, at a user computer system, protected content, wherein the protected content is not viewable by the user. The method includes receiving, at the user computer system, appended content. The method further includes viewing, by the user, the appended content, wherein the viewing of the appended content results in the protected content being viewable by the user. The method additionally includes viewing the protected content by the user.

Other embodiments include a computer readable medium having computer readable code thereon for providing advertisements as keys for streaming protected content. The computer readable medium includes instructions for receiving, at a user computer system, protected content, wherein the protected content is not viewable by the user. The computer readable medium includes instructions for receiving, at the user computer system, appended content. The computer readable medium further includes instructions for viewing, by the user, the appended content, wherein the viewing of the appended content results in the protected content being viewable by the user. The computer readable medium additionally includes instructions for viewing the protected content by the user.

Still other embodiments include a computerized device, configured to process all the method operations disclosed herein as embodiments of the invention. In such embodiments, the computerized device includes a memory system, a processor, communications interface in an interconnection mechanism connecting these components. The memory system is encoded with a process that provides advertisements as keys for streaming protected content as explained herein that when performed (e.g. when executing) on the processor, operates as explained herein within the computerized device to perform all of the method embodiments and operations explained herein as embodiments of the invention. Thus any computerized device that performs or is programmed to perform processing explained herein is an embodiment of the invention.

Other arrangements of embodiments of the invention that are disclosed herein include software programs to perform the method embodiment steps and operations summarized above and disclosed in detail below. More particularly, a computer program product is one embodiment that has a computer-readable medium including computer program logic encoded thereon that when performed in a computerized device provides associated operations providing advertisements as keys for streaming protected content as explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention. Software processes that operate in a collection of computerized devices, such as in a group of data communications devices or other entities can also provide the system of the invention. The system of the invention can be distributed between many software processes on several data communications devices, or all processes could run on a small set of dedicated computers, or on one computer alone.

It is to be understood that the embodiments of the invention can be embodied strictly as a software program, as software and hardware, or as hardware and/or circuitry alone, such as within a data communications device. The features of the invention, as explained herein, may be employed in data communications devices and/or software systems for such devices.

Note that each of the different features, techniques, configurations, etc. discussed in this disclosure can be executed independently or in combination. Accordingly, the present invention can be embodied and viewed in many different ways. Also, note that this summary section herein does not specify every embodiment and/or incrementally novel aspect of the present disclosure or claimed invention. Instead, this summary only provides a preliminary discussion of different embodiments and corresponding points of novelty over conventional techniques. For additional details, elements, and/or possible perspectives (permutations) of the invention, the reader is directed to the Detailed Description section and corresponding figures of the present disclosure as further discussed below.

BRIEF DESCRIPTION OF THE DRAWINGS

The foregoing will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Figure 1:
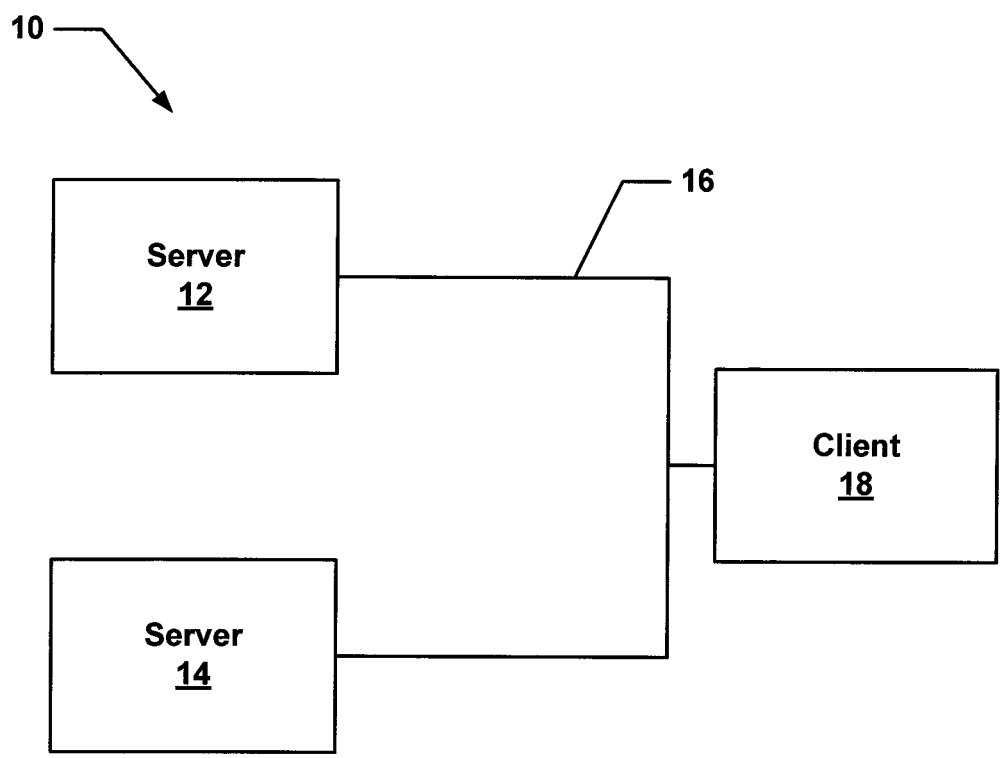
FIG. 1 is an example client/server system providing advertisements as keys for protected content in accordance with embodiments of the invention.

A method and apparatus for downloading and/or streaming of protected content is described in which advertisements are used as a key to unlock the protected content. Consider the following scenario of streaming protected content from a server to a client. The server wishes to stream the content to the client such that the certain requirements are met. These requirements include efficiency, verifiability and access control.

Efficiency relates to the content being delivered cost-effectively (in terms of network bandwidth, as well as computational cost) to the client. Verifiability requires that the intended content is delivered to the client correctly. Access control requires that only the authorized clients can decode the content.

The appended content (i.e. an advertisement) is used as keys to decode the protected content. As a result, without the appended content, the client is unable to decrypt the content; thus, the presently described technique separates the right to the content from the act of downloading/streaming the content (or part of the content). Note that the appended content—which can be tailored advertisement for each client—acts as decryption key; thus, without the appended content, the downloaded coded content is unviewable. As a result, the presently described technique simultaneously allows authentication/access control as well as enforcing the advertisements to be viewed/downloaded at the client.

By separating the right to the content from the act of downloading the content, the need to sequentially download the advertisement from a first server and then the content from a second server is eliminated. With the presently described scheme, the second server can serve its advertisement before the first server serves its content; the first server and the second server can transfer the content and the advertisement simultaneously; or the content can be downloaded from the second server prior to the advertisements being downloaded from the first server. Since the content cannot be decoded until the advertisement from the second server is downloaded/viewed, the content is "locked" until the advertisement is viewed. Therefore, the content can be protected while allowing efficient use of network resources (including the first and second servers).

This idea of separating the rights to the content from the act of downloading the content can be applied to coded as well as uncoded systems. The advertisement (or some key associated with the advertisement) can be used as the decryption key to the cryptographic encryption schemes used in uncoded systems.

In a further embodiment, network coding can be used to provide efficient delivery of content; however, the idea of using the appended content (such as advertisements) as the keys to decode the protected content can be used with or without network coding.

A network coded system can be used to meet the requirements listed above. By allowing nodes within the network to linearly combine data packets, network coding has been shown to be efficient in content dissemination, especially in peer-to-peer and wireless networks. In order for a client to decode the data, the client needs enough linearly independent combinations of the packets, defined as degrees of freedom. Once enough degrees of freedom has been collected to decode a given file or part of a file, the client solves the set of linear equations to recover the original data packets.

In addition, since network coding eliminates the need to schedule packets care-fully, the content (as well as the appended content) can be served not only by the servers but also by the peers. Therefore, network coding is not only robust in terms of failures within the network, but also can take the load off the server and distribute it among the clients within the network.

The performance benefits of network coding do not come at the cost of verifiability. Network coding allows verifiability of the content in varying granularity (from a whole file/part of a file verifiability to per-packet verifiability. Furthermore, the file/packet can be verified not only by the client, but any node within the network without decoding the entire file. This is an important feature as the nodes within the network can cooperate to eliminate undesired content within the network without decoding the file, while facilitating the dissemination of the desired content within the network.

Network coding naturally provides encryption of the content since only the nodes with enough degrees of freedom can decode the content. However, this is not the only authentication/encryption mechanism available. Traditional cryptographic methods of protecting data and authenticating users can be used in a network coded system. However, one major drawback of traditional authentication/encryption methods is its large overhead and complexity.

With network coding scheme, there are light weight encryption methods, which encodes only the coding coefficients. It is important to note that in order to decode the content, a node needs to perform Gaussian-elimination on the coding coefficients. Thus, encrypting the coding coefficients has the effect of encrypting the entire content. However, since we are only protecting the coding coefficients (instead of the entire content), we result in a system with lower overhead and complexity.

Referring now to FIG. 1, a block diagram of an example client/server system 10 providing advertisements as keys for protected content in accordance with embodiments of the invention is shown. System 10 includes a first server 12 in communication with a client 18. A second server 14 is also in communication with client 18. Server 12 provides appended content (e.g., an advertisement) to client 18. Server 14 provides protected content to client 18. While two servers are shown, one for providing the advertisement and the other for providing the protected content, it should be appreciated that one server could provide both the advertisements and the protected content. Unlike conventional systems, in this system 10, the advertisement and the protected content can be provided in any order, including being provided simultaneously. The protected content is only viewable upon the client 18 viewing the advertisement.

Figure 2:
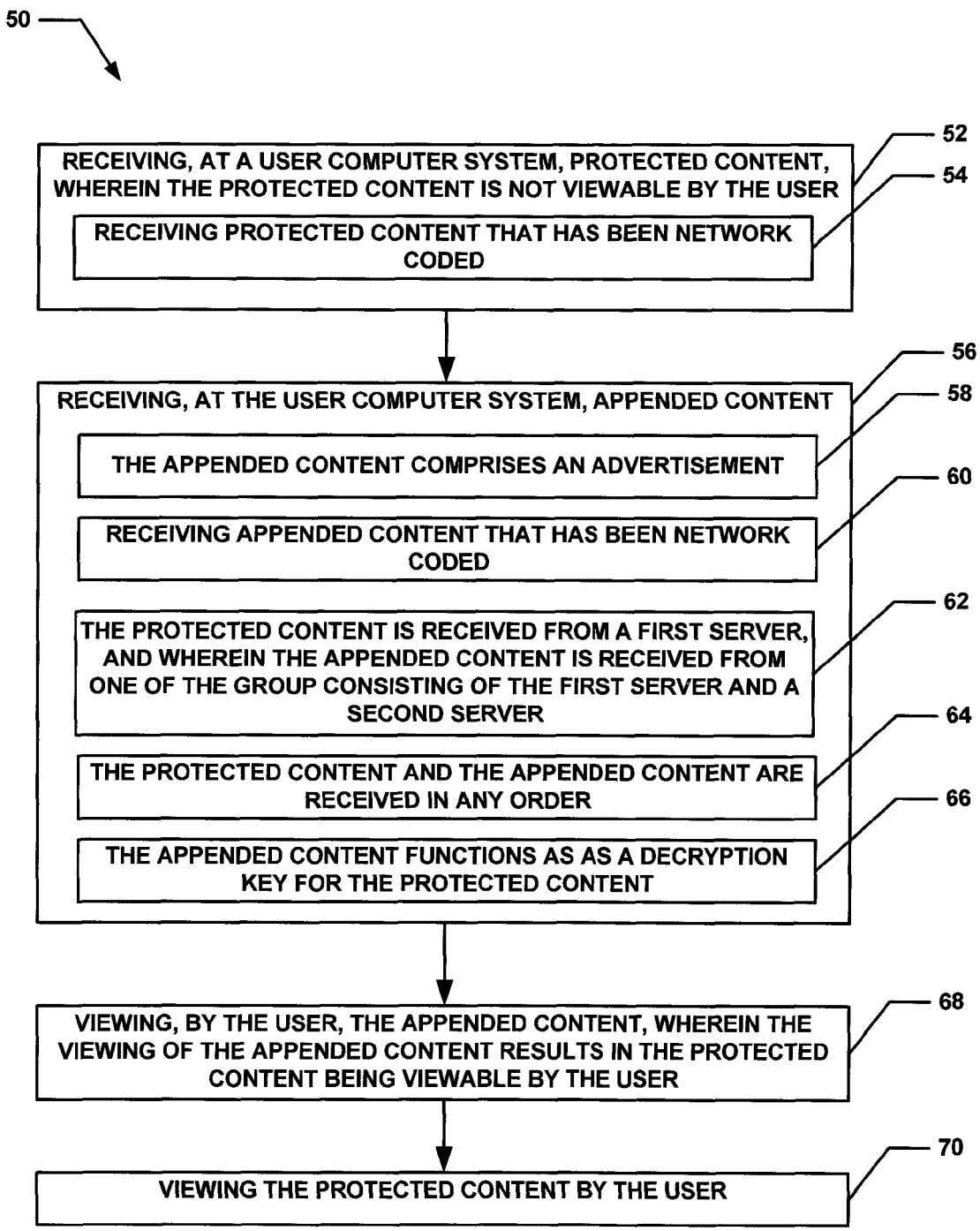
FIG. 2 is a flow diagram of a particular embodiment of a method for providing advertisements as keys for protected content in accordance with embodiments of the invention.

A flow chart of a particular embodiment of the presently disclosed method is depicted in FIG. 2. The rectangular elements are herein denoted "processing blocks" and represent computer software instructions or groups of instructions. Alternatively, the processing blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Referring now to FIG. 2, a particular embodiment of a method 50 for using advertisements as keys for streaming protected data is shown. Method 50 begins with processing block 52 which discloses receiving, at a user computer system, protected content, wherein the protected content is not viewable by the user. The protected content is provided to the user in response to a request for the content by the user. As further shown in processing block 54, in some instances the protected content may be network coded. The protected content may be streaming data, such as a television program, movie, or the like.

Processing block 56 states receiving, at the user computer system, appended content. As shown in processing block 58, the appended content comprises an advertisement. In some embodiments the appended content may be tailored to the particular user. For example, if a user requests an episode of a television series related to travel, a travel-related advertisement may be provided to the user. As further shown in processing block 60, the protected content may be network coded. Processing block 62 recites the protected content is received from a first server, and wherein the appended content is received from one of the group consisting of the first server and a second server. Processing block 64 discloses wherein the protected content and the appended content are received in any order. Processing block 66 states the appended content functions as a decryption key for the protected content.

Processing continues with processing block 68 which recites viewing, by the user, the appended content, wherein the viewing of the appended content results in the protected content now being viewable by the user. Processing block 70 discloses viewing the protected content by the user. Having viewed the appended content, the protected content is now rendered unprotected and the user is able to view the requested content.

Figure 3:
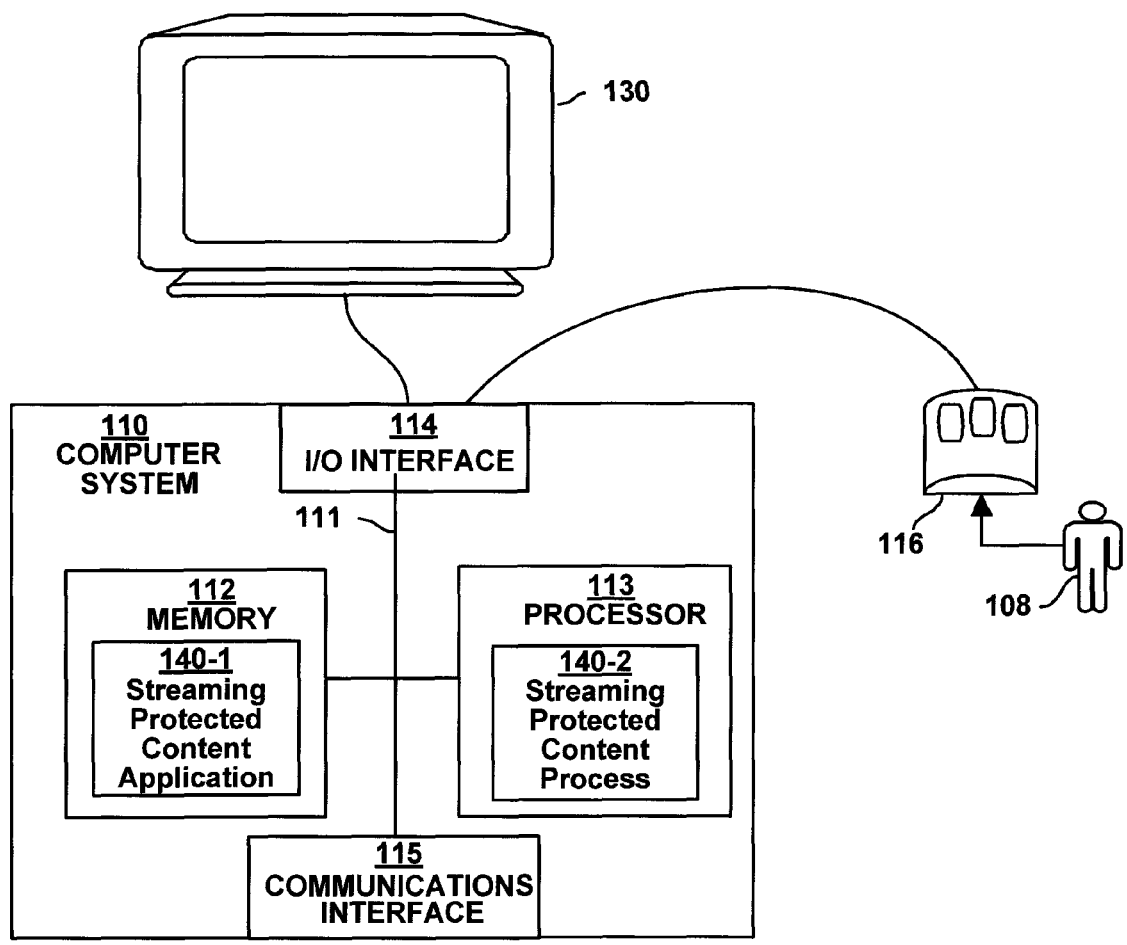
FIG. 3 illustrates an example computer system architecture for a computer system that operates with advertisements as keys for protected content in accordance with embodiments of the invention.

FIG. 3 is a block diagram illustrating example architecture of a computer system 110 that executes, runs, interprets, operates or otherwise performs a streaming protected content application 140-1 and streaming protected content process 140-2 suitable for use in explaining example configurations disclosed herein. The computer system 110 may be any type of computerized device such as a personal computer, workstation, portable computing device, console, laptop, network terminal or the like. An input device 116 (e.g., one or more customer/developer controlled devices such as a keyboard, mouse, etc.) couples to processor 113 through I/O interface 114, and enables a customer 108 to provide input commands, and generally control the graphical customer interface that the streaming protected content application 140-1 and process 140-2 provides on the display 130. As shown in this example, the computer system 110 includes an interconnection mechanism 111 such as a data bus or other circuitry that couples a memory system 112, a processor 113, an input/output interface 114, and a communications interface 115. The communications interface 115 enables the computer system 110 to communicate with other devices (i.e., other computers) on a network (not shown).

The memory system 112 is any type of computer readable medium, and in this example, is encoded with a streaming protected content application 140-1 as explained herein. The streaming protected content application 140-1 may be embodied as software code such as data and/or logic instructions (e.g., code stored in the memory or on another computer readable medium such as a removable disk) that supports processing functionality according to different embodiments described herein. During operation of the computer system 110, the processor 113 accesses the memory system 112 via the interconnect 111 in order to launch, run, execute, interpret or otherwise perform the logic instructions of a streaming protected content application 140-1. Execution of a streaming protected content application 140-1 in this manner produces processing functionality in the streaming protected content process 140-2. In other words, the streaming protected content process 140-2 represents one or more portions or runtime instances of a streaming protected content application 140-1 (or the entire a streaming protected content application 140-1) performing or executing within or upon the processor 113 in the computerized device 110 at runtime.

It is noted that example configurations disclosed herein include the streaming protected content application 140-1 itself (i.e., in the form of un-executed or non-performing logic instructions and/or data). The streaming protected content application 140-1 may be stored on a computer readable medium (such as a floppy disk), hard disk, electronic, magnetic, optical, or other computer readable medium. A streaming protected content application 140-1 may also be stored in a memory system 112 such as in firmware, read only memory (ROM), or, as in this example, as executable code in, for example, Random Access Memory (RAM). In addition to these embodiments, it should also be noted that other embodiments herein include the execution of a streaming protected content application 140-1 in the processor 113 as the streaming protected content process 140-2. Those skilled in the art will understand that the computer system 110 may include other processes and/or software and hardware components, such as an operating system not shown in this example.

A display 130 need not be coupled directly to computer system 110. For example, the streaming protected content application 140-1 can be executed on a remotely accessible computerized device via the network interface 115. In this instance, the graphical customer interface may be displayed locally to a customer 108 of the remote computer, and execution of the processing herein may be client-server based.

During operation, processor 113 of computer system 110 accesses memory system 112 via the interconnect 111 in order to launch, run, execute, interpret or otherwise perform the logic instructions of the streaming protected content application 140-1. Execution of streaming protected content application 140-1 produces processing functionality in streaming protected content process 140-2. In other words, the streaming protected content process 140-2 represents one or more portions of the streaming protected content application 140-1 (or the entire application) performing within or upon the processor 113 in the computer system 110.

It should be noted that, in addition to the streaming protected content process 140-2, embodiments herein include the streaming protected content application 140-1 itself (i.e., the un-executed or non-performing logic instructions and/or data). The streaming protected content application 140-1 can be stored on a computer readable medium such as a floppy disk, hard disk, or optical medium. The streaming protected content application 140-1 can also be stored in a memory type system such as in firmware, read only memory (ROM), or, as in this example, as executable code within the memory system 112 (e.g., within Random Access Memory or RAM).

In addition to these embodiments, it should also be noted that other embodiments herein include the execution of streaming protected content application 140-1 in processor 113 as the streaming protected content process 140-2. Those skilled in the art will understand that the computer system 110 include other processes and/or software and hardware components, such as an operating system that controls allocation and use of hardware resources associated with the computer system 110.

The device(s) or computer systems that integrate with the processor(s) may include, for example, a personal computer (s), workstation(s) (e.g., Sun, HP), personal digital assistant (s) (PDA(s)), handheld device(s) such as cellular telephone (s), laptop(s), handheld computer(s), or another device(s) capable of being integrated with a processor(s) that may operate as provided herein. Accordingly, the devices provided herein are not exhaustive and are provided for illustration and not limitation.

References to "a microprocessor" and "a processor", or "the microprocessor" and "the processor," may be understood to include one or more microprocessors that may communicate in a stand-alone and/or a distributed environment(s), and may thus be configured to communicate via wired or wireless communications with other processors, where such one or more processor may be configured to operate on one or more processor-controlled devices that may be similar or different devices. Use of such "microprocessor" or "processor" terminology may thus also be understood to include a central processing unit, an arithmetic logic unit, an application-specific integrated circuit (IC), and/or a task engine, with such examples provided for illustration and not limitation.

Furthermore, references to memory, unless otherwise specified, may include one or more processor-readable and accessible memory elements and/or components that may be internal to the processor-controlled device, external to the processor-controlled device, and/or may be accessed via a wired or wireless network using a variety of communications protocols, and unless otherwise specified, may be arranged to include a combination of external and internal memory devices, where such memory may be contiguous and/or partitioned based on the application. Accordingly, references to a database may be understood to include one or more memory associations, where such references may include commercially available database products (e.g., SQL, Informix, Oracle) and also proprietary databases, and may also include other structures for associating memory such as links, queues, graphs, trees, with such structures provided for illustration and not limitation.

References to a network, unless provided otherwise, may include one or more intranets and/or the Internet, as well as a virtual network. References herein to microprocessor instructions or microprocessor-executable instructions, in accordance with the above, may be understood to include programmable hardware.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and/or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. The computer readable medium can also include a communications link, either optical, wired, or wireless, having program code segments carried thereon as digital or analog signals. Accordingly, it is submitted that that the invention should not be limited to the described embodiments but rather should be limited only by the spirit and scope of the appended claims.

What is claimed is:

1. A computer-implemented method in which a computer system performs operations comprising:

receiving, at a user computer system, protected content, wherein said protected content is not viewable by said user, wherein said receiving protected content comprises receiving protected content that has been network coded;

receiving, at said user computer system, appended content, wherein said appended content comprises an advertisement, and wherein said appended content functions as a decryption key for said protected content;

viewing, by said user, said appended content, wherein said viewing of said appended content results in said protected content being viewable by said user;

viewing said protected content by said user; and wherein said network coded includes providing linearly combined data packets from a set of original data packets and wherein once enough linear combinations of data packets are received to satisfy a network coding algorithm, a set of linear equations are derived for said received linear combinations of data packets and wherein said linear equations are solved to recover said original data packets.

2. The method of claim 1 wherein said receiving appended content comprises receiving appended content that has been network coded.

3. The method of claim 1 wherein said protected content is received from a first server, and wherein said appended content is received from one of the group consisting of said first server and a second server.

4. The method of claim 1 wherein said protected content and said appended content are received in any order.

5. A non-transitory computer readable storage medium having computer readable code thereon for using advertisements as keys for streaming protected content, the medium including instructions in which a computer system performs operations comprising:

receiving, at a user computer system, protected content, wherein said protected content is not viewable by said user, wherein said receiving protected content comprises receiving protected content that has been network coded;

receiving, at said user computer system, appended content, wherein said appended content comprises an advertisement, and wherein said appended content functions as a decryption key for said protected content;

viewing, by said user, said appended content, wherein said viewing of said appended content results in said protected content being viewable by said user;

viewing said protected content by said user; and wherein said network coded includes providing linearly combined data packets from a set of original data packets and wherein once enough linear combinations of data packets are received to satisfy a network coding algorithm, a set of linear equations are derived for said received linear combinations of data packets and wherein said linear equations are solved to recover said original data packets.

6. The computer readable storage medium of claim 5 wherein said receiving appended content comprises receiving computer readable storage medium content that has been network coded.

7. The computer readable storage medium of claim 5 wherein said protected content is received from a first server, and wherein said appended content is received from one of the group consisting of said first server and a second server.

8. The computer readable storage medium of claim 5 wherein said protected content and said appended content are received in any order.

9. A computer system comprising:
a memory;
a hardware processor;
a communications interface;
an interconnection mechanism coupling the memory, the processor and the communications interface; and
wherein the memory is encoded with an application providing advertisements as keys for streaming protected content, that when executed on the processor, provides a process for processing information, the process causing the computer system to perform the operations of:

receiving, at a user computer system, protected content, wherein said protected content is not viewable by said user, wherein said receiving protected content comprises receiving protected content that has been network coded;

receiving, at said user computer system, appended content, wherein said appended content comprises an advertisement, and wherein said appended content functions as a decryption key for said protected content;

viewing, by said user, said appended content, wherein said viewing of said appended content results in said protected content being viewable by said user;

viewing said protected content by said user; and wherein said network coded includes providing linearly combined data packets from a set of original data packets and wherein once enough linear combinations of data packets are received to satisfy a network coding algorithm, a set of linear equations are derived for said received linear combinations of data packets and wherein said linear equations are solved to recover said original data packets.

10. The computer system of claim 9 wherein said receiving appended content comprises receiving appended content that has been network coded.

11. The computer system of claim 9 wherein said protected content is received from a first server, and wherein said appended content is received from one of the group consisting of said first server and a second server.

12. The computer system of claim 9 wherein said protected content and said appended content are received in any order.

* * * * *